Aug. 28, 1962 H. S. HAYNES 3,051,906

PULSE WAVEFORM SYNTHESIZER USING PLURALITY OF INDIVIDUALLY CHARGED STORAGE MEANS SEQUENTIALLY DISCHARGED THROUGH COMMON LOAD

Filed May 26, 1958

Inventor
HERBERT S. HAYNES
By Alfred C. Hill
Agent

United States Patent Office 3,051,906
Patented Aug. 28, 1962

3,051,906

PULSE WAVEFORM SYNTHESIZER USING PLURALITY OF INDIVIDUALLY CHARGED STORAGE MEANS SEQUENTIALLY DISCHARGED THROUGH COMMON LOAD

Herbert S. Haynes, Montclair, N.J., assignor to International Telephone and Telegraph Corporation, Nutley, N.J., a corporation of Maryland Filed May 26, 1958, Ser. No. 737,714
7 Claims. (Cl. 328—14)

This invention relates to pulse generating circuits and in particular to pulse generating circuits which provide outputs of predetermined shape.

It is well known that bandwidth can be conserved in radar systems by the proper choice of the modulating pulse. In particular, Gaussian waveforms have been found to be more economical in generated bandwidth. This type of pulse is used with the object of reducing the number and magnitude of the transmitted sidebands. Efforts have been directed recently to schemes for generating Gaussian waveshapes for use in systems where narrow bandwidth requirements are in order. The prior art schemes have been, in general, rather complex and use techniques which do not readily provide the waveshape desired. Further, there are applications in present day systems which require input waveforms which are not of the standard variety. There are instances in computer work where special functions or waveforms are required which simulate certain conditions and such functions are not easily generated.

It is therefore an object of this invention to provide a waveform generating circuit which is an improvement on prior art circuitry.

It is another object of this invention to provide means for generating waveforms approximating any desired shape.

It is a further object of this invention to provide a waveform generating circuit whose output approximates a Gaussian waveshape.

A feature of this invention is the utilization of a plurality of electrical storage means, a utilization means coupled in common to each of the storage means and means coupled to each of said storage means to charge each of said storage means to a predetermined value. In conjunction with the foregoing elements, means coupled to each of said storage means are utilized to sequentially discharge the storage means through a utilization means to approximate a waveform of predetermined shape.

Another feature of this invention is the utilization of pulse forming networks in conjunction with a plurality of thyratrons to discharge the pulse forming networks through a common load to provide a waveform approximating a Gaussian distribution.

Figure 1:
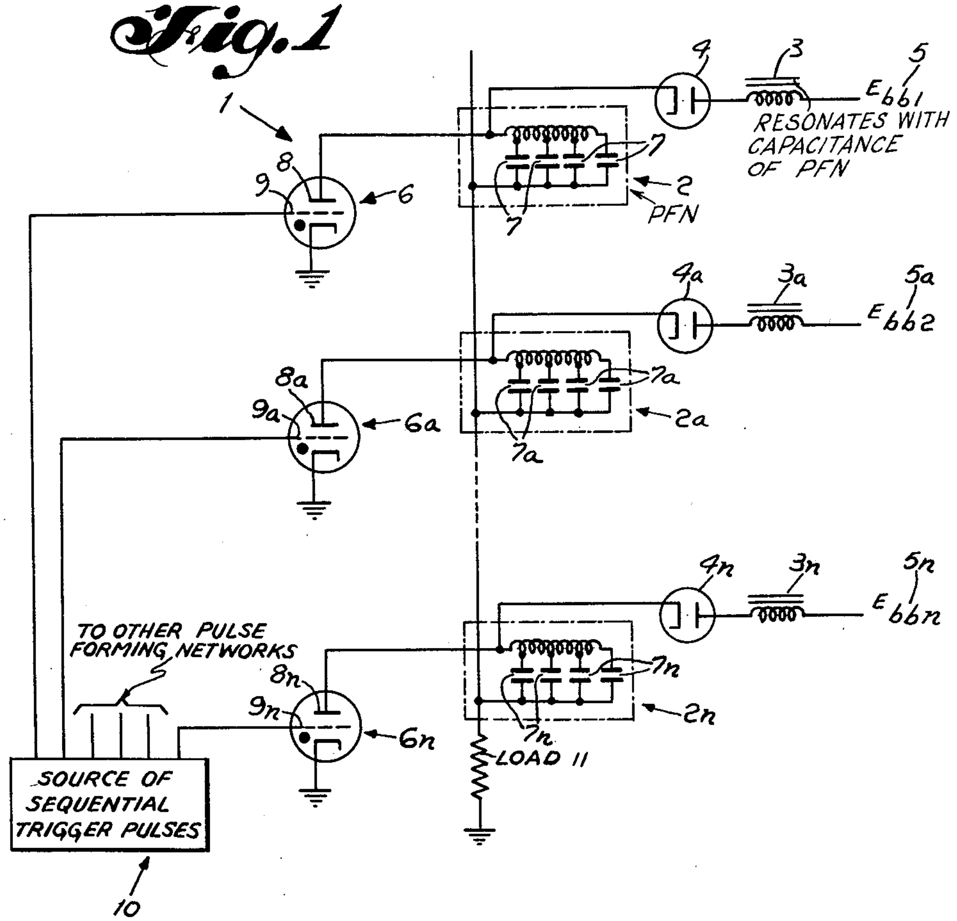
Figure 2:
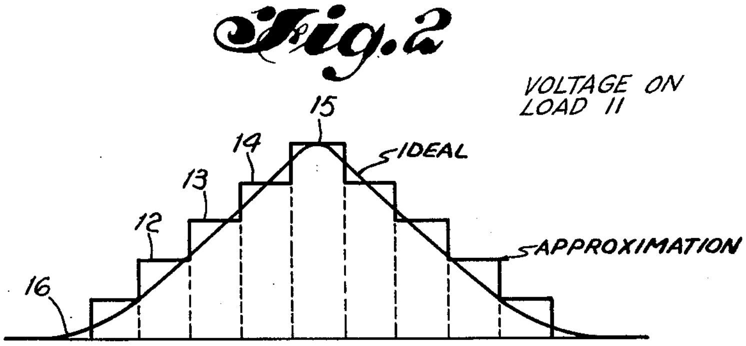

The above-mentioned and other features and objects of this invention will become more apparent by reference to the following description taken in conjunction with the accompanying drawings, in which:

FIG. 1 shows a schematic representation of a waveform generating circuit which provides an output across a common load which approximates a predetermined waveform; and FIG. 2 shows a representation of a Gaussian waveform and the separate waveforms which are combined to approximate the Gaussian waveshape.

FIG. 1 shows a waveform generating circuit 1 having a plurality of electrical storage means 2 connected through a plurality of charging chokes 3 and isolating diodes 4 to charging voltage means 5. Electrical energy storing means 2 may be a pulse forming network or other storage means well known to those skilled in the art. Switching means 6 are coupled to electrical energy storing means 2 such that the maximum voltage to which the condensers 7 of electrical storage means 2 are charged up is also placed on plate 8 of switching means 6. Switching means 6 may be gas discharge tubes such as thyratrons. The grids 9 of switching means 6 are connected to a source of sequential trigger pulses 10. The source of sequential trigger pulses 10 applies a trigger pulse to the grids 9 of switching means 6 thereby causing electrical energy storage means 2 to discharge through utilization means 11 in the sequence in which pulses are applied to switching means 6. Utilization means 11 indicated schematically as a resistor may be, for instance, a high power triode which is the output stage of a high power radar transmitter.

In operation, voltage sources 5, which may be batteries or some other source of D.C. potential, are each of a predetermined value as indicated by the symbols $Ebb_1$, $Ebb_2 \ldots Ebb_n$ in FIG. 1. Since charge is stored on the capacitors in the pulse forming networks 2, a capacitive reactance is offered by the network during the charging time. Charging choke 3 connected in series with this capacity provides the proper value of inductance and an oscillatory circuit results. When the voltage, such as $Ebb_1$, is applied from source 5, a voltage is suddenly applied to this resonant combination. This sudden change of voltage attempts to set up a train of damped oscillations. Diode 4, however, permits electrons to flow in only one direction during charging and when the current attempts to reverse in direction, the diode becomes non-conducting and prevents any further change of charge on the network. The result is that the network can be charged to twice the applied voltage and will hold this charge until such time as the circuit is discharged by applying a pulse from the trigger pulse source 10 to grid 9 of switching means 6 which then permits the electrical energy storing means 2 to discharge through utilization means 11 which is a relatively low impedance path. Each of the pulse generating circuits operates in the manner just described and the discharge voltage and firing sequence are governed by the desired waveform output. The trigger pulse source 10 is, of course programmed to provide the proper sequence.

The output from a pulse forming network 2 is indicated on FIG. 2 by waveform 12, for instance. Waveforms 13, 14, 15 are supplied by the discharge of other pulse forming networks and, as can be seen, while they are of the same shape, each is of different amplitude due to that fact that a given amplitude of voltage is applied to the pulse forming network, the given amplitude being a predetermined value. In FIG. 2, ideal Gaussian waveform 16 may be synthesized by combining a plurality of pulses of the same or different pulse widths such as 12, 13, 14 and 15 to approximate the desired waveshape. The narrower the pulse widths obtainable, the more closely the actual ideal waveshape will be approximated. Thus, the output across utilization means 11 is shown in FIG. 2 as the solid line series of steps which follows fairly closely the ideal Gaussian waveform 16. Since it is possible to obtain pulses of extremely small pulse width, it may be seen that it is possible to synthesize a Gaussian waveform by this means. However, practical considerations may limit the number of circuits which may be used, but in any event, a sufficient number of circuits should be used to provide an output which approximates the waveform desired.

By properly adjusting voltages from voltage sources 5 and the trigger pulse sequence, it is possible to obtain as output waveshape across utilization means 11 which has any predetermined shape.

While I have described above the principles of my invention in connection with specific apparatus, it is to be clearly understood that this description is made only by way of example and not as a limitation to the scope of my invention as set forth in the objects thereof and in the accompanying claims.

I claim:

1. A pulse waveform synthesizing network comprising a plurality of electrical energy storage means, utilization means coupled in common to each of said storage means, means coupled to each of said storage means to charge each of said storage means to a predetermined value of voltage, and means coupled to each of said storage means to sequentially discharge said storage means through said utilization means to provide a waveform approximating a predetermined shape.

2. A pulse waveform synthesizing network comprising a plurality of pulse forming networks each having two terminals, load resistor means coupled in common to one terminal of each of said pulse forming networks, voltage means coupled to the other terminal of each of said pulse forming networks to change each of said pulse forming networks to a predetermined value of voltage, and means coupled to said other terminal of each of said pulse forming networks to sequentially discharge said pulse forming networks through said load resistor to provide a waveform approximating a predetermined shape.

3. A pulse waveform synthesizing network comprising a plurality of electrical energy storage means, utilization means coupled in common to each of said storage means, voltage means and isolation means coupled to each of said storage means to charge each of said storage means to a predetermined value of voltage, a normally non-conductive device coupled to each of said storage means, a source of pulses having a plurality of sequentially time related outputs and means coupling an output of said source of pulses to each of said normally non-conducting devices to sequentially render said non-conductive devices conductive to sequentially discharge said storage means through said load to provide a waveform approximating a predetermined shape.

4. A pulse waveform synthesizing network comprising a plurality of electrical storage means, utilization means coupled in common to each of said storage means, voltage means and isolation means coupled to each of said storage means to charge each of said storage means to a predetermined value of voltage, a normally non-conductive electron discharge means coupled to each of said storage means, a source of pulses having a plurality of sequentially time related outputs and means coupling an output of said source of pulses to each of said electron discharge devices to sequentially render said electron discharge devices conductive to sequentially discharge said storage means through said utilization means to provide a waveform approximating a predetermined shape.

5. A pulse waveform synthesizing network comprising a plurality of electrical storage means, utilization means coupled in common to each of said storage means, voltage means and isolation means coupled to each of said storage means to charge each of said storage means to a predetermined value of voltage, a thyratron coupled to each of said storage means, a source of pulses having a plurality of sequentially time related outputs and means coupling an output of said source of pulses to each of said thyratrons to sequentially render said thyratron conductive to sequentially discharge said storage means through said utilization means to provide a waveform approximating a predetermined shape.

6. A pulse waveform synthesizing network comprising a plurality of electrical energy storage means, utilization means coupled in parallel to each of said storage means, means coupled to each of said storage means to charge each of said storage means to a predetermined value of voltage and switching means coupled in series with each of said storage means to sequentially discharge said storage means through said utilization means to provide a waveform approximating a predetermined shape.

7. A pulse waveform synthesizing network comprising a plurality of electrical energy storage means, utilization means coupled in parallel to each of said storage means, means coupled to each of said storage means to charge each of said storage means to a predetermined value of voltage and switching means coupled in series with each of said storage means to sequentially discharge said storage means through said utilization means to provide a waveform approximating a Gaussian shape.

References Cited in the file of this patent

UNITED STATES PATENTS

| | | |
|---|---|---|
| 2,483,411 | Grieg | Oct. 4, 1949 |
| 2,646,503 | Winter | July 21, 1953 |
| 2,663,795 | Mohr | Dec. 22, 1953 |
| 2,668,188 | Naslund | Feb. 2, 1954 |
| 2,697,783 | Miedke | Dec. 21, 1954 |
| 2,820,142 | Kelliher | Jan. 14, 1958 |
| 2,942,191 | Welty | June 21, 1960 |